(12) United States Patent
Aida et al.

(10) Patent No.: US 7,820,774 B2
(45) Date of Patent: Oct. 26, 2010

(54) ETHYLENE/TETRAFLUOROETHYLENE COPOLYMER COMPOSITION

(75) Inventors: Shigeru Aida, Chiyoda-ku (JP); Takashi Sato, Chiyoda-ku (JP); Yoshiaki Higuchi, Chiyoda-ku (JP); Hiroki Kamiya, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 797 days.

(21) Appl. No.: 11/689,737

(22) Filed: Mar. 22, 2007

(65) Prior Publication Data

US 2007/0232754 A1 Oct. 4, 2007

(30) Foreign Application Priority Data

Apr. 3, 2006 (JP) ............................. 2006-102479

(51) Int. Cl.
*C08F 14/18* (2006.01)
*C08F 114/18* (2006.01)
*C08F 210/00* (2006.01)
*C08L 27/12* (2006.01)
*C08L 23/04* (2006.01)

(52) U.S. Cl. .................. 526/255; 526/348; 525/199; 525/240

(58) Field of Classification Search .............. 526/255, 526/348; 525/199, 240
See application file for complete search history.

(56) References Cited

U.S. PATENT DOCUMENTS 3,870,689 A   3/1975  Modena et al.
6,020,417 A * 2/2000  Umemoto et al. ........... 524/546
6,538,084 B2 * 3/2003  Kitahara et al. ............. 526/250
7,019,079 B2  3/2006  Sumi et al.

FOREIGN PATENT DOCUMENTS

| EP | 0 638 596 A1 | 2/1995 |
| EP | 0 939 088 A1 | 9/1999 |
| EP | 1 336 627 A1 | 8/2003 |
| EP | 1 405 876 A1 | 4/2004 |
| JP | 2000-204205 | 7/2000 |
| JP | 2000-212365 | 8/2000 |

* cited by examiner

*Primary Examiner*—Nathan M Nutter
(74) *Attorney, Agent, or Firm*—Oblon, Spivak, McClelland, Maier & Neustadt, L.L.P.

(57) ABSTRACT

The present invention provides an ethylene/tetrafluoroethylene copolymer composition having a high melt flowability while maintaining satisfactory mechanical properties in the obtainable molded product are maintained. The ethylene/tetrafluoroethylene copolymer composition (C) has a melt viscosity of from 80 to 500 Pa·s, preferably from 100 to 300 Pa·s and a tensile elongation of from 200 to 500%, preferably from 350 to 450%. The copolymer composition (C) is may be obtained by melt kneading an ethylene/tetrafluoroethylene copolymer (A) having a low melt viscosity of from 60 to 400 Pa·s, preferably from 80 to 300 Pa·s and an ethylene/tetrafluoroethylene copolymer (B) having a melt viscosity higher than this i.e. from 600 to 10,000 Pa·s, preferably from 1,000 to 7,000 Pa·s in a mass ratio of (A)/(B)=50/50 to 99/1, preferably (A)/(B)=60/40 to 97/3.

7 Claims, No Drawings

ETHYLENE/TETRAFLUOROETHYLENE COPOLYMER COMPOSITION

The present invention relates to an ethylene/tetrafluoroethylene copolymer composition having excellent mechanical properties and melt flowability.

An ethylene/tetrafluoroethylene copolymer (hereinafter referred to also as "ETFE") is excellent in terms of heat resistance, weather resistance, electrical insulating properties, non-stick property, water and oil repellency, etc. In particular, among fluororesins, ETFE has high moldability and mechanical strength. Accordingly, a wide range of its molded products such as pump casings, diaphragm casings, joints, packings, tubes, coated wires, sheets, films, linings, coatings and filaments, can be produced by a melt molding method such as injection molding, extrusion molding or blow molding, using this material. However, it is desired to expand the use of this material to other applications.

In order to meet the needs of such applications, it is necessary to further improve the melt flowability of ETFE, for example, in a case where injection molding or extrusion molding is carried out at a higher speed, in a case where it is processed into a molded product of a very fine shape, or in a case where a high moldability is required.

Further, it is desired to blend or incorporate various fillers, pigments or additives as the case requires, for improvement of the strength of a molded product, the dimensional stability, the electromagnetic wave shielding property, improvement of the surface property, coloration, etc. However, if fillers, etc. are blended or incorporated in a high ratio to conventional ETFE, there has been a problem that the melt viscosity tends to be high, and the moldability tends to deteriorate.

Still further, also in cases where ETFE is impregnated to a fiber material or inorganic porous material made of non-woven fabric, glass fiber, carbon fiber, aramid fiber or ceramics to obtain a composite material such as a film for tents, a porous printed board, etc., the ETFE is required to be highly melt-flowable in order to have it easily and reproducibly impregnated into the interior of the fiber or into the pores.

Heretofore, with respect to ETFE, there has been a problem that if the molecular weight is made low in order to increase the melt flowability, the heat resistance or mechanical properties of the molded product thereby obtainable tend to be low. Particularly, it has been a serious obstruction against expansion of the application of the molded product that by the reduction of the molecular weight, the tensile strength of the ETFE molded product decreases.

Whereas, a method is known to lower the melt viscosity and to improve the moldability by blending a high molecular weight ETFE (a) and a low molecular weight ETFE (b) (JP-A-2000-212365). However, the melt flowability of ETFE actually obtained was at a level of from 4,200 to 4,500 Pa·s, and the flowability of this level was not sufficient in a case where a still higher melt flowability was required.

It is an object of the present invention to provide an ethylene/tetrafluoroethylene copolymer composition having a high melt flowability while maintaining the mechanical properties of a molded product, for which a development is desired under the circumstances described above.

According to the present invention, the following ethylene/tetrafluoroethylene copolymer composition having a high melt flowability is provided.

(1) An ethylene/tetrafluoroethylene copolymer composition (C) with a high melt flowability, which has a melt viscosity of from 80 to 500 Pa·s and a tensile elongation of from 200 to 500%.

(2) The ethylene/tetrafluoroethylene copolymer composition (C) according to (1), wherein the melt viscosity is from 100 to 350 Pa·s and the tensile elongation is from 250 to 450%.

(3) The ethylene/tetrafluoroethylene copolymer composition (C) according to (1), wherein the melt viscosity is from 100 to 300 Pa·s and the tensile elongation is from 350 to 450%.

(4) The ethylene/tetrafluoroethylene copolymer composition (C) according to any one of (1) to (3), which comprises an ethylene/tetrafluoroethylene copolymer (A) having a melt viscosity of from 60 to 400 Pa·s and an ethylene/tetrafluoroethylene copolymer (B) having a melt viscosity of from 600 to 10,000 Pa·s in a mass ratio of (A)/(B)=50/50 to 99/1.

(5) The ethylene/tetrafluoroethylene copolymer composition (C) according to (4), wherein the melt viscosity of the ethylene/tetrafluoroethylene copolymer (A) is from 80 to 300 Pa·s and the melt viscosity of the ethylene/tetrafluoroethylene copolymer (B) is from 1,000 to 7,000 Pa·s.

(6) The ethylene/tetrafluoroethylene copolymer composition (C) according to (5), wherein the mass ratio is (A)/(B)=60/40 to 97/3.

(7) The ethylene/tetrafluoroethylene copolymer composition (C) according to (5), wherein the mass ratio is (A)/(B)=70/30 to 95/5.

(8) A process for producing the ethylene/tetrafluoroethylene copolymer composition (C) as defined in any one of (4) to (7), which comprises melting and kneading the ethylene/tetrafluoroethylene copolymer (A) and the ethylene/tetrafluoroethylene copolymer (B).

The present invention provides an ethylene/tetrafluoroethylene copolymer composition, whereby the mechanical properties, such as the tensile elongation, of the molded product are substantially maintained, while as compared with heretofore, the melt flowability has been improved, for example, by ten times.

The copolymer composition of the present invention has a high melt flowability without lowering the tensile elongation of the molded product, whereby high speed molding or production of a very fine extrusion molded product can be accomplished.

Further, the ethylene/tetrafluoroethylene copolymer composition of the present invention has an extremely low melt viscosity, and it is suitable for producing a composite product having a powdery or fibrous filler, pigment or the like blended or incorporated at a high density, or because of its high melt flowability, it can be easily impregnated into the interior of the material such as non-woven fabric, glass fiber or carbon fiber.

Now, the present invention will be described in detail with reference to the preferred embodiments.

Melt Viscosity and Tensile Strength

The ethylene/tetrafluoroethylene copolymer composition (C) of the present invention (hereinafter sometimes referred to simply as "the ETFE composition" or "ETFE (C)") is an ethylene/tetrafluoroethylene copolymer composition having a high melt flowability characterized in that basically, its melt viscosity is from 80 to 500 Pa·s, and its tensile elongation is from 200 to 500%. And, preferably, its melt viscosity is from 100 to 350 Pa·s, and its tensile elongation is from 250 to 450%, and more preferably the melt viscosity is from 100 to 300 Pa·s, and its tensile elongation is from 350 to 450%.

When the melt viscosity of the ETFE composition is within such a range, high speed extrusion molding or injection molding thin-thickness extrusion molding or injection molding, or press molding is possible, and further, it is excellent also in the impregnation property to e.g. glass fiber. Further, when the tensile elongation of the molded product is also within the above range, there is no practical problem with respect to the mechanical strength. On the other hand, if the tensile elongation is less than this range, the molded product tends to be brittle, which is undesirable.

The ETFE composition of the present invention can easily be obtained basically by blending ETFE (A) having a lower melt viscosity of from 60 to 400 Pa·s and ETFE (B) having a higher melt viscosity of from 600 to 10,000 Pa·s in a mass ratio of (A)/(B)=50/50 to 99/1.

And, preferably, the melt viscosity of ETFE (A) is from 80 to 300 Pa·s, and the melt viscosity of ETFE (B) is from 1,000 to 7,000 Pa·s. If the melt viscosity of (A) or (B) is higher than this level, inadequate melt flowability tends to be obtained. On the other hand, if the melt viscosity is lower than this level, the tensile elongation of the molded product thereby obtained tends to be inadequate.

Further, the blend ratio of (A)/(B) is preferably from 60/40 to 97/3, more preferably from 70/30 to 95/5. If the blend ratio exceeds the above range or less than the above range, the obtainable ETFE composition will not be one which satisfies the characteristics of a melt viscosity of from 80 to 500 Pa·s and a tensile elongation of from 200 to 500%.

Measurement of Melt Viscosity

The melt viscosity (the melt flowability) within the range in the present invention is preferably measured by a capillary flowability-measuring apparatus (capillary rheometer). This is one wherein a molten resin is extruded at a constant speed to let it pass through a capillary, whereby the stress required for the extrusion is measured to obtain the melt viscosity. The lower the melt viscosity of ETFE, the lower the molecular weight of the ETFE, and the higher the melt viscosity, the higher the molecular weight of the ETFE.

The melt flowability of ETFE in the present invention is measured, e.g. as disclosed in Examples given hereinafter, by setting an orifice having a diameter of 1 mm and a length of 10 mm on a capillary rheometer "Capirograph" manufactured by Toyo Seiki Seisaku-sho, Ltd., under such conditions that the cylinder temperature is 240° C., and the piston speed is 10 mm/min.

Here, the temperature for melting ETFE is preferably a temperature higher by from 5 to 30° C. than the melting point of the ETFE. If the measurement is carried out under a condition lower than this temperature, ETFE will not sufficiently melt, whereby the measurement tends to be difficult, and if the measurement is carried out under a condition excessively higher than this temperature, the viscosity of ETFE tends to be too low, and molten ETFE will flow out of the orifice in a short time, whereby the measurement tends to be difficult.

Melting Point

The melting point of ETFE in the present invention is preferably from 120 to 280° C., more preferably from 150 to 270° C., most preferably from 180 to 260° C. The melting point of ETFE in the present invention is one obtained from the heat absorption peak when it is heated in an air atmosphere from room temperature to 300° C. at a rate of 10° C./min by means of a scanning differential calorimeter (DSC220CU, manufactured by Seiko Instruments Inc.), as shown in Examples given hereinafter.

Copolymer Composition of ETFE

ETFE contains repeating units based on ethylene (hereinafter sometimes referred to as "E") and repeating units based on tetrafluoroethylene (hereinafter sometimes referred to as "TFE"), wherein the content ratio (molar ratio) is preferably from 80/20 to 20/80, more preferably from 70/30 to 30/70, most preferably from 60/40 to 40/60.

If the molar ratio of (repeating units based on E)/(repeating units based on TFE) is extremely large, there may be a case where the heat resistance, weather resistance, chemical resistance, property to prevent permeation of a reagent, etc. of the ETFE tend to deteriorate. On the other hand, if such a molar ratio is extremely small, there may be a case where the mechanical strength, melt moldability, etc. tend to be low. When the molar ratio is within this range, the ETFE will be one excellent in the heat resistance, weather resistance, chemical resistance, the property to prevent permeation of a reagent, mechanical strength, melt moldability, etc.

Further, ETFE may contain, in addition to the above mentioned repeating units based on E and repeating units based on TFE, repeating units based on at least one type of other monomers within a range not impair the essential properties.

Examples of such other monomers include an α-olefin such as propylene or butene; a compound represented by $CH_2=CX(CF_2)_nY$ (wherein each of X and Y which are independent of each other, is hydrogen or a fluorine atom, and n is an integer of from 2 to 8); a fluoroolefin having hydrogen atoms in an unsaturated group, such as vinylidene fluoride (VDF), vinyl fluoride (VF), trifluoroethylene or hexafluoroisobutylene (HFIB); and a fluoroolefin having no hydrogen atoms in an unsaturated group (excluding TFE) such as hexafluoropropylene (HFP), chlorotrifluoroethylene (CTFE), perfluoro(methyl vinyl ether) (PMVE), perfluoro (ethyl vinyl ether) (PEVE), perfluoro(propyl vinyl ether) (PPVE), perfluoro(butyl vinyl ether) (PBVE) or other perfluoro(alkyl vinyl ether) (PAVE). One or more of such other monomers may be employed.

As such other monomers, it is particularly preferred to use the above mentioned compound represented by the formula $CH_2=CX(CF_2)_nY$ (hereinafter referred to as "FAE") among them. As mentioned above, FAE is a compound represented by the formula $CH_2=CX(CF_2)_nY$ (wherein each of X and Y which are independent of each other, is a hydrogen atom or a fluorine atom, and n is an integer of from 2 to 8). In the formula, if n is less than 2, the properties of ETFE may tend to be inadequate (for example, formation of stress cracks in the ETFE molded product). On the other hand if n in the formula exceeds 8, there may be a case where such is disadvantageous from the viewpoint of the polymerization reactivity.

FAE may, for example, be $CH_2=CF(CF_2)_2F$, $CH_2=CF(CF_2)_3F$, $CH_2=CF(CF_2)_4F$, $CH_2=CF(CF_2)_5F$, $CH_2=CF(CF_2)_8F$, $CH_2=CF(CF_2)_2H$, $CH_2=CF(CF_2)_3H$, $CH_2=CF(CF_2)_4H$, $CH_2=CF(CF_2)_5H$, $CH_2=CF(CF_2)_8H$, $CH_2=CH(CF_2)_2F$, $CH_2=CH(CF_2)_3F$, $CH_2=CH(CF_2)_4F$, $CH_2=CH(CF_2)_5F$, $CH_2=CH(CF_2)_8F$, $CH_2=CH(CF_2)_2H$, $CH_2=CH(CF_2)_3H$, $CH_2=CH(CF_2)_4H$, $CH_2=CH(CF_2)_8H$, or $CH_2=CH(CF_2)_8H$. One or more FAE may be employed.

Among them, a compound represented by $CH_2=CH(CF_2)_nY$ is preferred. In such a case, n in the formula is preferably from 2 to 6, since its molded product will be excellent in stress crack resistance, and n=2 to 4 is most preferred.

The content of repeating units based on FAE in the ETFE composition is preferably from 0.01 to 20 mol %, more preferably from 0.1 to 15 mol %, further preferably from 1 to 10 mol %, in the entire repeating units of the composition. If the content of FAE is less than the above range, the stress crack resistance of a molded product to be formed from the ETFE composition tends to be low, and there may be a case where a breaking phenomenon such as cracking under a stress may sometimes occur, and if it exceeds the above range, the mechanical strength of the composition may sometimes be low.

Method for Producing ETFE (A) and (B)

The method for producing ETFE (A) and ETFE (B) in the present invention may, for example, be (1) a method wherein the molecular weight is adjusted during the polymerization, (2) a method wherein an energy such as heat or radiation is applied to ETFE obtained by polymerization to cut the molecule and to lower the viscosity, or (3) a method wherein a molecular chain of ETFE obtained by polymerization is chemically cut by radicals to produce them, specifically, ETFE and an organic peroxide are melt-kneaded by an extruder to cut the molecular chain of ETFE by generated radicals to reduce the viscosity. In principle, any one of the methods may be applicable. However, the methods (2) and (3) have a problem such that active functional groups such as carbonyl groups are likely to be formed at the cut portions in ETFE, whereby undesirable adhesiveness, etc. are likely to result. Accordingly, the method (1) is most preferred, since no such active functional groups will be formed in the obtainable ETFE, and the productivity is high.

In the present invention, the method for producing ETFE (A) and (B) is not particularly limited, and a method is usually employed wherein ethylene and tetrafluoroethylene are introduced into a reactor and copolymerized by means of a commonly employed radical polymerization initiator or chain transfer agent. The polymerization method may, for example, be bulk polymerization known per se; solution polymerization using, as a polymerization medium, an organic solvent such as a fluorinated hydrocarbon, a chlorinated hydrocarbon, a fluorinated chlorohydrocarbon, an alcohol or a hydrocarbon; suspension polymerization using, as a polymerization medium, an aqueous medium and, if necessary, a suitable organic solvent; or emulsion polymerization using, as a polymerization medium, an aqueous medium and an emulsifier. However, a solution polymerization is most preferred wherein ethylene and tetrafluoroethylene as a fluorinated monomer are copolymerized in the presence of a radical polymerization initiator, a chain transfer agent and a polymerization medium. The polymerization may be carried out in a batch system or in a continuous system by using a single reactor or multi reactor system stirring type polymerization apparatus, tubular type polymerization apparatus, etc.

The radical polymerization initiator is preferably an initiator whereby the temperature at which the half-life period is 10 hours, is from 0 to 100° C., more preferably from 20 to 90° C. For example, an azo compound such as azobisisobutyronitrile; a peroxydicarbonate such as diisopropyl peroxydicarbonate; a peroxyester such as tert-butyl peroxypivalate, tert-butyl peroxyisobutyrate or tert-butyl peroxyacetate; a non-fluorinated diacyl peroxide such as isobutyryl peroxide, octanoyl peroxide, benzoyl peroxide or lauroyl peroxide; a fluorinated diacyl peroxide such as $(Z(CF_2)_pCOO)_2$ (wherein Z is a hydrogen atom, a fluorine atom or a chlorine atom, and p is an integer of from 1 to 10); or an inorganic peroxide such as potassium persulfate, sodium persulfate or ammonium persulfate, may, for example, be mentioned.

The polymerization medium may, for example, be an organic solvent such as a fluorinated hydrocarbon, a chlorinated hydrocarbon, a fluorinated chlorohydrocarbon, an alcohol or a hydrocarbon as mentioned above, or an aqueous medium.

The chain transfer agent may, for example, be an alcohol such as methanol or ethanol; a chlorofluorohydrocarbon such as 1,3-dichloro-1,1,2,2,3-pentafluoropropane or 1,1-dichloro-1-fluoroethane; or a hydrocarbon such as pentane, hexane or cyclohexane. The amount of the chain transfer agent is usually at a level of from 0.01 to 100 mass %, based on the polymerization medium. By adjusting the concentration of the chain transfer agent, it is possible to adjust the melt viscosity (the molecular weight) of ETFE thereby obtainable. Namely, as the concentration of the chain transfer agent is made high, it is possible to obtain ETFE having a low molecular weight. Particularly, in the case of producing an ethylene/tetrafluoroethylene copolymer (A) having a low molecular weight to be preferably used in the present invention, it is also preferred to use 1,3-dichloro-1,1,2,2,3-pentafluoropropane which is usually used as a chain transfer agent, as a polymerization medium.

The polymerization conditions are not particularly limited, but the polymerization temperature is usually from 0 to 100° C., more preferably from 20 to 90° C. Further, the polymerization pressure is preferably from 0.1 to 10 MPa, more preferably from 0.5 to 3 MPa. As the polymerization pressure becomes high within the above range, a molecular weight of the polymer thereby obtainable tends to be high, and the melt viscosity tends to be high, whereby by adjusting the polymerization pressure, it is possible to adjust the melt viscosity. The polymerization time may vary depending upon the polymerization temperature and the polymerization pressure, etc., but it is usually from 1 to 30 hours, more preferably from 2 to 10 hours.

The amount of ETFE relative to the polymerization medium at the termination of the polymerization reaction is usually at a level of from 0.03 to 0.2 g/cm³, and by this concentration, the molecular weight of ETFE can be adjusted. Namely, by adjusting the ETFE concentration to be low within the above range, it is possible to obtain ETFE having a low molecular weight.

Blend of ETFE (A) and (B)

In the present invention, the form of ETFE (A) and ETFE (B) is not particularly limited and may be any of pellets, beads, powder and clams. Further, ETFE (C) can be obtained by blending them, but most preferably, by using a single screw or twin screw extruder, ETFE (A) and (B) are put into it and melted, and the two resins are sufficiently melt-kneaded. ETFE (C) thus obtained is preferably formed into e.g. pellets. FILLER, ETC.

The ETFE composition of the present invention may be formed into a composite blended with the following filler, pigment, etc. to provide various properties. For example, it is possible to incorporate a fiber-reinforcing material such as carbon fiber, glass fiber or aramid fiber; a dimensional stabilizer such as glass beads; electroconductive or semiconductive filler such as carbon black, carbon nanotube, fluorinated CNT, stannic oxide, titanic acid black or titanic acid wisker; a transparent electroconductivity-imparting agent such as an ionized liquid; a surface modifier such as various wisker/potassium titanate, aluminum borate, carbon wisker or calcium carbonate wisker; a heat conductivity-imparting material such as graphite, magnesium oxide, a low melting point metal or a metal fiber; a sliding property-imparting material such as PTFE lubricant; an electromagnetic wave-shielding material such as ferrite or metal; a low gas permeable reinforcing material such as nano clay, fluorinated organic treated nano clay or talc; a weight reducing material such as glass balloons; a flexibility-imparting material such as various elastomers or fluorinated rubber; a high strength-imparting material such as nylon or aramid; a coloring pigment such as titanium oxide, zinc oxide, carbon black, copper/chromium black, molybdate orange, iron oxide, chrome yellow, yellow iron oxide, titanium yellow, titanium/antimony/chrome yellow, chrome green, chrome oxide green or cobalt green; further, crystal nucleus agent; a crosslinking agent or crosslinking adjuvant such as triallyl isocyanurate; or an additive such as a blowing agent, a blowing nucleus material, a heat stabilizer, copper, a copper compound (copper oxide or copper iodide), an antioxidant, a photostabilizer or an infrared absorber.

The ETFE composition of the present invention has an extremely low melt viscosity and thus can be formed into an ETFE composite having the above mentioned various particulate or fibrous fillers or pigments in a high density without impairing the moldability. Further, the ETFE composition has a high melt flowability and thus can easily be impregnated into the interior of a material such as non-woven fabric, glass fiber, aramid fiber, carbon fiber or a porous material made of ceramics.

Molded Product

The ETFE composition of the present invention can be easily molded and formed into a desired molded product by various molding methods such as injection molding, extrusion molding, blow molding, compression molding, inflation molding and transfer molding. Molded products obtainable from the ETFE composition of the present invention may be those in wide fields, such as pump casings, diaphragm valve casings, joints, packings, sealing materials, tubes, covered electric wires, sheets, films, linings, coatings, filaments, film structure components such as tent films, and printed boards.

Now, the present invention will be described in further detail with reference to the following Examples. However, the technical range of the present invention is by no means restricted thereto. Here, the melt viscosity, composition, melting point and tensile elongation of ETFE were measured by the following methods.

Measurement of Melt Viscosity (Pa·s)

An orifice having a diameter of 1 mm and a length of 10 mm was set on a capillary rheometer "Capirograph" manufactured by Toyo Seiki Seisaku-sho, Ltd., and molten ETFE was extruded under such conditions that the cylinder temperature was 240° C. and the piston speed was 10 mm/min, whereby the melt viscosity was measured.

Polymer Composition (mol %)

Calculated from the results of the measurement of the total fluorine amount and the melt $^{19}$F-NMR measurement.

Melting Point (° C.)

Obtained from the heat absorption peak at the time of heating the sample from room temperature to 300° C. at a rate of 10° C./min in an air atmosphere by using a scanning differential calorimeter (DSC220CU) manufactured by Seiko Instruments Inc.).

Tensile Elongation (%)

Measured by the method disclosed in ASTM D3159. The sample was prepared by hot pressing a sheet having a thickness of 1 mm, and a test piece was cut out from the sheet. The measurement was carried out at a tensile speed of 50 mm/min.

PREPARATION EXAMPLE 1

(1) A polymerization reactor equipped with a stirrer and having an internal capacity of 94 liters, was deaerated, and 87.3 kg of 1,3-dichloro-1,1,2,2,3-pentafluoropropane (AK225cb, manufactured by Asahi Glass Company, Limited, hereinafter referred to as "AK225cb") and 860 g of $CH_2$=$CH(CF_2)_4F$ were charged; the interior of the polymerization reactor was heated to 66° C. with stirring; a mixed gas of TFE/E=89/11 (molar ratio) was introduced until the pressure of the polymerization reactor became 1.4 MpaG; and 677 g of an AK225cb solution containing 1 mass % of tert-butyl peroxypivalate was charged as the polymerization initiator to initiate the polymerization. A mixed gas with a composition of TFE/E=60/40 (molar ratio) and $CH_2$=$CH(CF_2)_4F$ in a ratio corresponding to 3.3 mol % relative to the mixed gas, were continuously charged, so that the pressure was kept constant during the polymerization. After 8 hours from the initiation of the polymerization, and at the time when 7.1 kg of the mixed gas of monomers was charged, the internal temperature of the polymerization reactor was lowered to room temperature, and at the same time, purging was carried out to atmospheric pressure.

(2) The obtained slurry ETFE was put into a 200 L granulation tank having 77 kg of water charged and then heated to 105° C. with stirring to carry out granulation while the solvent was removed by distillation. The obtained granulated product was dried at 150° C. for 5 hours to obtain 7.0 kg of a sample of ETFE (hereinafter referred to as "ETFE1" (=ETFE (A))).

The polymer composition of the ETFE1 was repeating units based on TFE/repeating units based on E/repeating units based on $CH_2$=$CH(CF_2)_4F$=57.2/40.4/2.4 mol %, and the melting point was 223° C., and the melt viscosity was 120 Pa·s.

PREPARATION EXAMPLE 2

(1) A polymerization reactor equipped with a stirrer and having an internal capacity of 1.3 liter, was deaerated, and 1,154.4 g of AK225cb and 10.9 g of $CH_2$=$CH(CF_2)_4F$ were charged, and 163 g of TFE and 5.6 g of E were introduced with stirring; the interior of the polymerization reactor was heated to 66° C.; 7.5 g of an AK225cb solution containing 4 mass % of tert-butyl peroxypivalate was charged as a polymerization initiator to initiate the polymerization under a pressure of 1.36 MpaG. A mixed gas with a composition of TFE/E=60/40 (molar ratio) and $CH_2$=$CH(CF_2)_4F$ in a ratio corresponding to 3.3 mol % relative to the above mixed gas, were continuously charged, so that the pressure was kept constant during the polymerization. After 4.2 hours from the initiation of the polymerization, and at the time when 100 g of the mixed gas of monomers was charged, the internal temperature of the polymerization reactor was lowered to room temperature, and at the same time, purging was carried out to atmospheric pressure.

(2) The obtained slurry ETFE was subjected to suction filtration by a glass filter to separate ETFE and the solvent. The obtained ETFE was dried at 150° C. for 12 hours to obtain a sample ETFE (hereinafter referred to as "ETFE2" (=ETFE (A))).

The polymer composition of ETFE2, was repeating units based on TFE/repeating units based on E/repeating units based on $CH_2$=$CH(CF_2)_4F$=57.4/40.6/2.0 mol %, and further, the melting point was 230° C., and the melt viscosity was 224 Pa·s.

PREPARATION EXAMPLE 3

Polymerization was carried out in the same manner as in Preparation Example 2 except that instead of AK225cb disclosed in Preparation Example 2, 1,208 g of 1,1,1,2,2,3,3,4,4,5,5,6,6-tridecafluorohexane (hereinafter referred to as "$C_6H$") was charged; instead of 10.9 g of $CH_2$=$CH(CF_2)_4F$, 12.81 g of $CH_2$—$CH(CF_2)_4F$ and 16.5 g of methanol in addition were charged; and instead of 7.5 g of the AK225cb solution containing 4 mass % of tert-butyl peroxypivalate, 5.7 ml of a C6H solution containing 4 mass % of tert-butyl peroxypivalate was charged. After 3.3 hours from the initiation of the polymerization, and at the time when 90 g of the monomer gas was charged, the internal temperature of the polymerization reactor was lowered to room temperature, and at the same time, purging was carried out to atmospheric pressure.

The obtained slurry ETFE was transferred together with 300 ml of water to a 1.5 L eggplant-like flask, whereupon ETFE and the solvent were separated by a rotary evaporator. The obtained ETFE was dried at 150° C. for 12 hours to obtain sample ETFE (hereinafter referred as "ETFE5" (=ETFE (A))).

The polymer composition of ETFE5 was repeating units based on TFE/repeating units based on E/repeating units based on $CH_2=CH(CF_2)_4F=54.6/42.0/3.4$ mol %, and the melting point was 232° C., and the melt viscosity was 166 Pa·s.

REFERENCE EXAMPLE 1

Common ETFE (trade name: FLUON LM ETFE·LM-720, manufactured by Asahi Glass Company, Limited, melting point: 228° C., melt viscosity: 2,587 Pa·s, tensile strength: 44 MPa, tensile elongation: 426% (hereinafter referred to as "ETFE3" (=ETFE (B)))) was used as a reference sample.

EXAMPLE 1

ETFE1 (=ETFE (A)) and ETFE3 (=ETFE (B)) were mixed in a ratio of ETFE1/ETFE3=90/10 (mass ratio) and melt-kneaded by means of a single screw extruder (φ20 mm, manufactured by TANABE PLASTIC CO., LTD.) to obtain pellet-form ETFE4 (=ETFE (C)).

The melt viscosity of ETFE4 was 228 Pa·s, the tensile strength was 23 MPa, and the tensile elongation was 372%.

EXAMPLE 2

ETFE5 (=ETFE (A)) and ETFE3 (=ETFE (B)) were mixed in a ratio of ETFE5/ETFE3=90/10 (mass ratio) and melt-kneaded by means of a Labo Plastomill (manufactured by Toyo Seiki Seisaku-Sho, Ltd.) to obtain bulky ETFE6 (=ETFE (C)). The kneading was carried out at 240° C. at 100 rpm for 10 minutes.

ETFE6 had a melt viscosity of 322 Pa·s, the tensile strength was 22 MPa, and the tensile elongation was 294%.

COMPARATIVE EXAMPLE 1

ETFE1 had a tensile strength of 19 MPa and a tensile elongation of 172%.

COMPARATIVE EXAMPLE 2

ETFE2 had a tensile strength of 20 MPa and a tensile elongation of 147%.

COMPARATIVE EXAMPLE 3

ETFE5 had a tensile strength of 22 MPa and a tensile elongation of 92%. The above results are summarized in Table 1.

TABLE 1

| | Sample No. | Melt viscosity (Pa·s) | Tensile strength (MPa) | Tensile elongation (%) |
|---|---|---|---|---|
| Ex. 1 | ETFE4 | 228 | 23 | 372 |
| Ex. 2 | ETFE6 | 322 | 22 | 294 |
| Comp. Ex. 1 | ETFE1 | 120 | 19 | 172 |
| Comp. Ex. 2 | ETFE2 | 224 | 20 | 147 |
| Comp. Ex. 3 | ETFE5 | 166 | 22 | 92 |
| Ref. Ex. 1 | ETFE3 | 2587 | 44 | 426 |

As is evident from Table 1, the ETFE compositions of the present invention (Examples 1 and 2) have low melt viscosities of 228 Pa·s and 322 Pa·s, and while they are highly melt-flowable, their tensile elongations are 372% and 297%. It is noted that these characteristics are not substantially low as compared with the tensile elongation (426%) of the common ETFE in Reference Example 1 (melt viscosity: 2,587 Pa·s higher by one digit). This is in substantial contrast to e.g. Comparative Example 2 in that with ETFE2 in Comparative Example 2, while the melt viscosity is as low as Example 1 (224 Pa·s), its tensile elongation is substantially low at 147%, thus being very brittle.

INDUSTRIAL APPLICABILITY

The ETFE composition of the present invention is highly melt-flowable with the melt viscosity being from 80 to 500 Pa·s, while the tensile elongation is not substantially lower than the tensile elongation of ETFE having a melt viscosity higher by one digit, at a level of from 200 to 500%. Accordingly, it is possible to produce an extrusion molded product or an injection molded product with high productivity, and it is suitable also for the production of a fine extrusion molded product or injection molded product.

Further, the ETFE composition of the present invention has an extremely low melt viscosity and thus is suitable for the production of an ETFE composite having a powdery or fibrous filler or pigment of a metal material, an inorganic material or an organic material blended or incorporated at a high density.

Still further, the ETFE composition of the present invention has a high melt flowability, and it can be easily impregnated into the interior of non-woven fabric, glass fiber, aramid fiber, carbon fiber or a porous material made of ceramics, or a porous material made of a plastic material such as polyethylene, polyvinylidene fluoride or polypropylene.

The entire disclosure of Japanese Patent Application No. 2006-102479 filed on Apr. 3, 2006 including specification, claims and summary is incorporated herein by reference in its entirety.

What is claimed is:

1. An ethylene/tetrafluoroethylene copolymer composition (C) with a high melt flowability, which has a melt viscosity of from 100 to 350 Pa·s and a tensile elongation of from 250 to 450%, and which comprises
an ethylene/tetrafluoroethylene copolymer (A) having a melt viscosity of from 80 to 300 Pa·s and a melting point of 120 to 260° C., and
an ethylene/tetrafluoroethylene copolymer (B) having a melt viscosity of from 1000 to 7,000 Pa·s
in a mass ratio of (A)/(B)=60/40 to 97/3.

2. The ethylene/tetrafluoroethylene copolymer composition (C) according to claim 1, wherein the tensile elongation is measured according to ASTM D3159.

3. The ethylene/tetrafluoroethylene copolymer composition (C) according to claim 1, wherein the melt viscosity is measured as follows:
an orifice having a diameter of 1 mm and a length of 10 mm is set on a capillary rheometer "Capriograph," manufactured by Toyo Seiki Ltd. and a molten ethylene/tetrafluoroethylene copolymer is extruded under such conditions that a cylinder temperature is 240° C. and a piston speed is 10 mm/min and the melt viscosity is measured.

4. The ethylene/tetrafluoroethylene copolymer composition (C) according to claim 1, wherein the tensile elongation is measured according to ASTM D3159, and wherein the melt viscosity is measured as follows:
an orifice having a diameter of 1 mm and a length of 10 mm is set on a capillary rheometer "Capriograph," manufactured by Toyo Seiki Ltd. and a molten ethylene/tetrafluoroethylene copolymer is extruded under such conditions that a cylinder temperature is 240° C. and a piston speed is 10 mm/min and the melt viscosity is measured.

5. The ethylene/tetrafluoroethylene copolymer composition (C) according to claim 1, wherein the melt viscosity is from 100 to 300 Pa·s and the tensile elongation is from 350 to 450%.

6. The ethylene/tetrafluoroethylene copolymer composition (C) according to claim 1, wherein the mass ratio is (A)/(B)=70/30 to 95/5.

7. A process for producing the ethylene/tetrafluoroethylene copolymer composition (C) as defined in claim 1, which comprises melting and kneading the ethylene/tetrafluoroethylene copolymer (A) and the ethylene/tetrafluoroethylene copolymer (B).

* * * * *